United States Patent Office 2,949,977
Patented Aug. 23, 1960

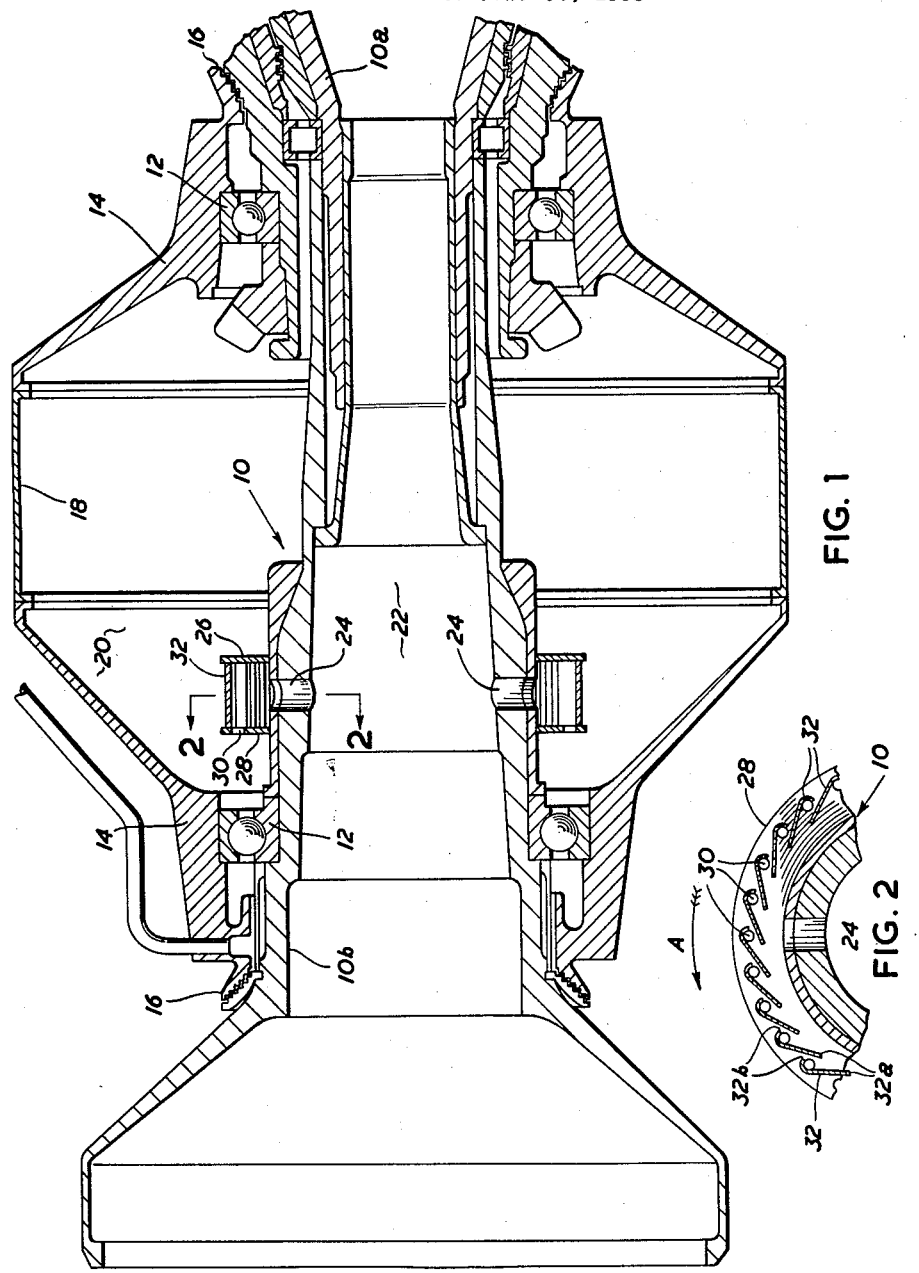

2,949,977

DEVICE FOR SEPARATING ENTRAINED OIL FROM A CURRENT OF GAS

Nicholas Klompas, Downsview, Ontario, Canada, assignor to Orenda Engines Limited, Malton, Ontario, Canada, a corporation of Canada Filed June 30, 1958, Ser. No. 745,620

3 Claims. (Cl. 183—77)

This application relates to devices for removing oil entrained in a current of gas, and particularly to an oil separator for removing entrained oil from air flowing out of an oil sump surrounding a rotating shaft, such as the shaft of a gas turbine engine.

In certain machines having a lubricated rotating shaft, it is frequently desirable to have air or other gas flowing through an oil sump surround the shaft. In such installations, the oil is in rapid movement and small particles of the oil become entrained in the air, and it is desirable that the entrained oil be removed from the air flow before the air leaves the oil sump.

For instance, in a gas turbine engine that has an annular oil sump surrounding the shaft, the oil is prevented from escaping from the sump by the use of labyrinth seals that depend for their efficient operation on a pressure differential on the two sides of the seal. In such cases, air is supplied to one side of the seal at a pressure higher than that exerted by the oil in the sump at the other side. The pressure exerted by the air, in conjunction with the tortuous path through the seal, prevents leakage of the oil, but some air continually enters the sump and must be vented. This air contains a considerable amount of entrained oil particles, and unless the oil is separated before the air is vented, the oil consumption will be unduly excessive.

The main object of this invention is to provide a suitable separator for recovering the entrained oil.

A further object of the invention is to provide a separator which will prevent oil that is splashed in the sump from directly entering the air outlet, particularly at low speeds, and that will also extract and discharge back into the sump the very small droplets of oil produced at high shaft speeds.

In an application such as that described, the shaft is hollow and the air is normally vented into the shaft through apertures in the shaft wall.

According to the invention, the wall of the shaft has an opening leading out of the sump into the interior of the shaft and providing an air outlet, and annular flanges are provided on the shaft at each side of the outlet opening as separator walls, the flanges providing mountings for oil impeller blades extending between the flanges. The blades rotate with the shaft and engage oil particles entrained in the air flowing between the separator walls into the outlet. At least one of the flanges has apertures adjacent the blades so that oil collecting on the blades may pass through the walls and back into the sump.

The drawings illustrate a preferred form of the invention as embodied in an annular oil sump surrounding the shaft of a gas turbine engine. In the drawings, in which each reference character denotes the same part in the various views:

Fig. 1 is a sectional view taken in a plane through the longitudinal axis of the shaft; and Fig. 2 is a sectional view taken on the line 2—2 of Fig. 1.

In the arrangement illustrated, the main shaft assembly 10 of a gas turbine engine is supported in pairs of bearings 12 which are carried by annular bearing supports 14, providing labyrinth seals 16 between the bearing supports and the shaft assembly. The bearing supports are connected by a sump wall 18 so as to enclose an annular oil sump 20 surrounding the shaft assembly 10 between the bearing 12. The shaft rotates in the direction of the arrow A in Fig. 2.

The shaft assembly 10 includes a shaft $10^a$ and a stub-shaft $10^b$ which are hollow, providing an air outlet passage 22. Air outlet apertures 24 in the stub-shaft wall lead into the venting space from the sump 20. Air entering the sump through the labyrinth seals 16 is vented from the sump through the apertures 24.

On the stub-shaft at both sides of the apertures 24 are annular flanges 26 and 28, the latter preferably having oil flow apertures 30, the flanges providing oil separator walls. A plurality of oil impeller blades 32 extend in an axial direction between the flanges, to which they may be secured by any suitable means, such as brazing, to provide a rigid assembly. Each blade has a leading edge $32^a$ and a trailing edge $32^b$, and the blades are preferably arranged so that the leading edge of each blade is nearer the shaft assembly than the trailing edge.

Preferably, each blade 32 is so shaped that the major part of the blade extending from the leading edge $32^a$ toward the trailing edge $32^b$ is straight and the blade curves toward the shaft near its trailing edge. The curve of this part of the blade may suitably conform to the arc of a circle, as shown in Fig. 2, and the oil flow apertures 30, which preferably are circular, may be arranged to register with the arc of curvature of the respective blades 32.

For the most efficient separation, it is preferable that the angle subtended at the centre of shaft between the leading and trailing edges of each of the blades should overlap the like angle subtended by the leading and trailing edges of adjacent blades, so that there is no straight open radial path between the blades from any part of the oil sump 20 to the air outlet apertures 24.

Many variations in the arrangement described will be obvious to one skilled in the art, and it is to be understood that the form of the invention shown and described is to be taken as a preferred example of the same and that various changes may be made without departing from the spirit of the invention and the scope of the claims.

What I claim as my invention is:

1. An oil separator for removing entrained oil from air flowing out of an oil sump surrounding a rotating shaft, comprising an air outlet passage extending axially within the shaft; a pair of annular flanges in spaced relation embracing and secured to the shaft; an aperture in the shaft intermediate said flanges and leading from the sump to the passage; a plurality of circumferentially spaced, non-radial blades extending generally axially of the shaft between the flanges, each blade extending generally transversely of the shaft between a leading edge and a trailing edge, both edges being spaced from the shaft with the trailing edge spaced further from the shaft than the leading edge, each blade having a straight portion extending from the leading edge, and a curved portion extending from the trailing edge to the straight portion, each curved portion being concave towards the shaft; and a plurality of apertures in at least one of the flanges, each aperture leading from a space between the shaft and the curved portion of a blade to the sump.

2. An oil separator according to claim 1, in which the curved portion of each blade is curved through the arc of a circle and each aperture is circular, the edge of the aperture being in alignment with the inner surface of the curved portion.

3. An oil separator according to claim 1, in which the angle subtended at the center of the shaft between the leading and trailing edges of each blade overlaps the similar angle subtended by the edges of each adjacent blade so that each of said apertures lies between the straight portion of one blade and the curved portion of an adjacent blade.

References Cited in the file of this patent

UNITED STATES PATENTS

| | | |
|---|---|---|
| 1,508,405 | Mazza | Sept. 16, 1924 |
| 2,364,368 | Jarnaker | Dec. 5, 1944 |
| 2,779,435 | Hoeltje | Jan. 29, 1957 |
| 2,889,007 | Lunde | June 2, 1959 |